US012770274B2

(12) United States Patent
Danielsson et al.

(10) Patent No.: US 12,770,274 B2
(45) Date of Patent: Oct. 20, 2026

(54) METHOD AND SYSTEM FOR DETECTING A CHANGE OF RATIO OF OCCLUSION OF A TRACKED OBJECT

(71) Applicant: Axis AB, Lund (SE)

(72) Inventors: Niclas Danielsson, Lund (SE); Anton Öhrn, Lund (SE)

(73) Assignee: AXIS AB, Lund (SE)

( * ) Notice: Subject to any disclaimer, the term of this patent is extended or adjusted under 35 U.S.C. 154(b) by 226 days.

(21) Appl. No.: 18/653,343

(22) Filed: May 2, 2024

(65) Prior Publication Data

US 2024/0404083 A1 Dec. 5, 2024

(30) Foreign Application Priority Data

May 31, 2023 (EP) .................................... 23176361

(51) Int. Cl.
*G06T 7/246* (2017.01)
*G06V 10/75* (2022.01)

(52) U.S. Cl.
CPC ............ *G06T 7/248* (2017.01); *G06V 10/751* (2022.01); *G06T 2207/10016* (2013.01)

(58) Field of Classification Search
CPC . G06T 7/248; G06T 2207/10016; G06T 7/20; G06T 7/269; G06T 7/11; G06T 7/246; G06T 2210/12; G06V 10/751; G06V 20/46; G06V 10/25; G06V 20/52
USPC .......................................................... 382/103
See application file for complete search history.

(56) References Cited

U.S. PATENT DOCUMENTS

| | | | | |
|---|---|---|---|---|
| 11,537,819 | B1 * | 12/2022 | Das | G06F 18/24 |
| 2016/0342837 | A1 * | 11/2016 | Hong | G06T 3/40 |
| 2018/0211396 | A1 * | 7/2018 | Roshtkhari Javan | G06T 7/246 |
| 2019/0130189 | A1 | 5/2019 | Zhou et al. | |
| 2020/0097756 | A1 * | 3/2020 | Hashimoto | G06V 10/25 |
| 2021/0090284 | A1 * | 3/2021 | Ning | G06V 10/82 |
| 2021/0216798 | A1 * | 7/2021 | Littman | G06V 10/454 |
| 2021/0407107 | A1 * | 12/2021 | Lee | G06V 10/74 |

(Continued)

FOREIGN PATENT DOCUMENTS

CN 105405151 B 1/2018

OTHER PUBLICATIONS

Wojkie, N., et al., "Simple Online and Real Time Tracking with a Deep Association Metric", University of Koblenz-Landau, (2017).

(Continued)

*Primary Examiner* — Jennifer Mehmood
*Assistant Examiner* — Heath E. Wells
(74) *Attorney, Agent, or Firm* — Volpe Koenig

(57) ABSTRACT

A method of detecting a change of ratio of occlusion of a tracked object in a video sequence. For each of a plurality of image frames, a bounding box of the tracked object is determined and for each pair of successive image frames, an intersection over union (IoU) of a first bounding box in a first image frame and a second bounding box in a second image frame is calculated. Similarly, for a further pair of successive image frames, a further IoU of a first bounding box in a first image frame of the further pair of successive image frames and a second bounding box in a second image frame of the further pair of successive image frames is calculated. If the further IoU differs from the calculated IoUs by more than a threshold amount, the ratio of occlusion of the tracked object has changed.

12 Claims, 6 Drawing Sheets

(56) References Cited

U.S. PATENT DOCUMENTS

| | | | | |
|---|---|---|---|---|
| 2022/0019854 | A1 | 1/2022 | Yan et al. | |
| 2022/0383576 | A1 | 12/2022 | Bashkirov et al. | |
| 2023/0360255 | A1 * | 11/2023 | Kocamaz | G06T 7/292 |
| 2025/0201018 | A1 * | 6/2025 | Kang | G06V 10/82 |

OTHER PUBLICATIONS

Shao, J., et al., "PFRL: Pose-Free Reinforcement Learning for 6D Pose Estimation", Tsinghua University, Beijing, China, (2021).

Extended European Search Report issued on Dec. 21, 2023 for European Patent Application No. 23176361.6.

* cited by examiner

METHOD AND SYSTEM FOR DETECTING A CHANGE OF RATIO OF OCCLUSION OF A TRACKED OBJECT

TECHNICAL FIELD

The present invention relates to detection of changes in relation to a tracked object in a video sequence and handling of tracking the object, and specifically to detecting a change of ratio of occlusion of a tracked object in a video sequence and/or deciding to refrain from using re-identification in tracking the object.

BACKGROUND

When tracking an object in a video sequence it may be useful to detect when a part of the tracked object goes from being visible in an image frame to becoming occluded in a successive image frame of the video sequence or vice versa, i.e., a change of the ratio of occlusion of the tracked object between two successive image frames, such as when the tracked object moves behind or out from behind something in the scene captured in the video sequence. Such detection is useful, e.g., when deciding whether to use functions based on the appearance of a detected object, such as re-identification, in object tracking when identifying which object detection in an image frame corresponds to an object detection in a previous image frame. In prior art such detection has been suggested. However, the suggested methods have drawbacks such as being complex. Hence, there is still a need for improvements in detecting a change of ratio of occlusion of a tracked object between two successive image frames.

SUMMARY OF THE INVENTION

An object of the present invention is to overcome or at least mitigate the problems of prior art.

According to a first aspect, a computer implemented method of detecting a change of ratio of occlusion of a tracked object in a video sequence is provided. For each of a plurality of image frames of the video sequence, a bounding box or a mask of the tracked object is determined. For each pair of successive image frames of a plurality of pairs of successive image frames of the plurality of image frames, an intersection over union, IoU, of a first bounding box in a first image frame of the pair of successive image frames and a second bounding box in a second image frame of the pair of successive image frames or of a first mask in the first image frame of the pair of successive image frames and a second mask in the second image frame of the pair of successive image frames is calculated. Similarly, for a further pair of successive image frames subsequent to the plurality of pairs of successive image frames in the plurality of image fames, a further intersection over union, IoU, of a first bounding box in a first image frame of the further pair of successive image frames and a second bounding box in a second image frame of the further pair of successive image frames or of a first mask in the first image frame of the further pair of successive image frames and a second mask in the second image frame of the further pair of successive image frames is calculated. On condition that the further IoU differs from the calculated IoUs of the plurality of pairs of successive image frames by more than a threshold amount, it is detected that a ratio of occlusion of the tracked object has changed.

The invention makes use of the realization that when an object is moving, an intersection over union, IoU, between bounding boxes or masks in a first and second image frame of a video sequence will be different when a part of the object that is visible in the first image frame becomes occluded in the second image frame or vice versa as compared to an IoU, between bounding boxes or masks in a first and second image frame of a video sequence where the ratio of occlusion of the object does not change between the first and second images.

The calculation of the further IoU of the further pair of successive image frames and of the IoUs of the plurality of pairs of successive image frames as well as the comparison to determine if the further IoU differs from the calculated IoUs of the plurality of pairs of successive image frames by more than a threshold amount are straightforward and non-complex. Hence, the method according to the first aspect enables straightforward and non-complex detection that a ratio of occlusion of a tracked object has changed.

Furthermore, when a ratio of occlusion of a tracked object changes considerably between the further pair of successive image frames as compared to the ratio of occlusion of the tracked object in the plurality of pairs of successive image frames, the further IoU will differ considerably from the calculated IoUs of the plurality of pairs of successive image frames. Hence, the method according to the first aspect enables reliable detection that a ratio of occlusion of a tracked object has changed.

By a 'bounding box of the tracked object' is meant a box that encloses the tracked object. The term 'bounding box' is used as it is generally understood within video analytics in relation to object detection. Typically, a bounding box of a tracked object is the minimal box that encloses the tracked object. Methods for detecting an object and determining a bounding box are well known in the art.

By a 'mask of the tracked object' is meant a mask that encloses the tracked object. The term 'mask' is used as it is generally understood within video analytics in relation to object detection. Typically, a mask of a tracked object coincides with or is close to the outline of the tracked object. Methods for detecting an object and determining a mask, e.g., by segmentation, are well known in the art.

By 'intersection over union', IoU, is meant a division or ratio of the area of the intersection between a first area, e.g., a first bounding box or mask, and a second area, e.g., a second bounding box or mask, and the union between the first area and the second area.

It is to be noted that both the plurality of pairs of successive image frames and the further pair of successive image frames belong to the plurality of image frames. Hence, it is implicit that the plurality of pairs of successive image frames does not constitute all of the plurality of image frames.

The method according to the first aspect may further comprise calculating a mean or median of the IoUs of the plurality of pairs of successive image frames. The act of detecting then comprises, on condition that the further IoU differs from the determined mean or median of the IoUs of the plurality of pairs of successive image frames by more than a threshold amount, detecting that a ratio of occlusion of the tracked object has changed.

The mean may either be an unweighted mean, or it may be a weighted mean. For example, a weighted mean may be used where a weight of an IoU increases with how late in the plurality of pairs of successive image frames, i.e., the closer to the further pair of successive image frames, the pair of successive image frames occurs for which the IoU is calculated. For example, the weights may increase exponentially.

By using a weighted mean, the difference between the further IoU differs from the calculated IoUs of the plurality of pairs of successive image frames can be made more dependent on IoUs of pairs of successive image frames of the plurality of pairs of successive image frames that are closer to the further pair of successive image frames in the plurality of image frames, i.e., in the video sequence.

In addition to calculating a mean or median, the method according to the first aspect may further comprise calculating a variance of the IoUs of the plurality of pairs of successive image frames, and setting the threshold using the calculated variance.

By setting the threshold using the calculated variance, the threshold may be set such that change of a ratio of occlusion of the tracked object is only detected if the further IoU differs from the calculated IoUs of the plurality of pairs of successive image frames more than normal variation within the plurality of pairs of successive image frames as indicated by the variance.

According to a second aspect, a computer implemented method of deciding to refrain from using re-identification in tracking an object in image frames of a video sequence is provided. For each of a plurality of image frames of the video sequence, a bounding box or a mask of the tracked object is determined. For each pair of successive image frames of a plurality of pairs of successive image frames of the plurality of image frames, an intersection over union, IoU, of a first bounding box in a first image frame of the pair of successive image frames and a second bounding box in a second image frame of the pair of successive image frames or of a first mask in the first image frame of the pair of successive image frames and a second mask in the second image frame of the pair of successive image frames is calculated. For a further pair of successive image frames subsequent to the plurality of pairs of successive image frames in the plurality of image fames, a further intersection over union, IoU, of a first bounding box in a first image frame of the further pair of successive image frames and a second bounding box in a second image frame of the further pair of successive image frames or of a first mask in the first image frame of the further pair of successive image frames and a second mask in the second image frame of the further pair of successive image frames is calculated. On condition that the further IoU differs from the calculated IoUs of the plurality of pairs of successive image frames by more than a threshold amount, it is decided to refrain from using re-identification in tracking the object in the further pair of successive image frames.

The above-mentioned optional additional features of the method according to the first aspect, when applicable, apply to the method according to the second aspect as well. In order to avoid undue repetition, reference is made to the above.

According to a third aspect, a non-transitory computer-readable storage medium is provided having stored thereon instructions for implementing the method according to the first aspect or a method according to the second aspect, when executed in a device having a processor.

The above-mentioned optional additional features of the method according to the first aspect, when applicable, apply to the non-transitory computer-readable storage medium according to the third aspect as well. In order to avoid undue repetition, reference is made to the above.

According to a fourth aspect, a device is provided. The device comprises circuitry configured to execute a determining function, a first calculating function, a second calculating function, and a detecting function. The determining function is configured to determine, for each of a plurality of image frames of a video sequence, a bounding box or a mask of the tracked object. The first calculating function is configured to calculate, for each pair of successive image frames of a plurality of pairs of successive image frames of the plurality of image frames, an intersection over union, IoU, of a first bounding box in a first image frame of the pair of successive image frames and a second bounding box in a second image frame of the pair of successive image frames or of a first mask in the first image frame of the pair of successive image frames and a second mask in the second image frame of the pair of successive image frames. The second calculating function is configured to calculate, for a further pair of successive image frames subsequent to the plurality of pairs of successive image frames in the plurality of image fames, a further intersection over union, IoU, of a first bounding box in a first image frame of the further pair of successive image frames and a second bounding box in a second image frame of the further pair of successive image frames or of a first mask in the first image frame of the further pair of successive image frames and a second mask in the second image frame of the further pair of successive image frames. The detecting function is configured to, on condition that the further IoU differs from the calculated IoUs of the plurality of pairs of successive image frames by more than a threshold amount, detect that a ratio of occlusion of the tracked object has changed.

The above-mentioned optional additional features of the method according to the first aspect, when applicable, apply to the device according to the fourth aspect as well. In order to avoid undue repetition, reference is made to the above.

According to a fifth aspect, a device is provided. The device comprises circuitry configured to execute a determining function, a first calculating function, a second calculating function, and a deciding function. The determining function is configured to determine, for each of a plurality of image frames of a video sequence, a bounding box or a mask of the tracked object. The first calculating function is configured to calculate, for each pair of successive image frames of a plurality of pairs of successive image frames of the plurality of image frames, an intersection over union, IoU, of a first bounding box in a first image frame of the pair of successive image frames and a second bounding box in a second image frame of the pair of successive image frames or of a first mask in the first image frame of the pair of successive image frames and a second mask in the second image frame of the pair of successive image frames. The second calculating function is configured to calculate, for a further pair of successive image frames subsequent to the plurality of pairs of successive image frames in the plurality of image fames, a further intersection over union, IoU, of a first bounding box in a first image frame of the further pair of successive image frames and a second bounding box in a second image frame of the further pair of successive image frames or of a first mask in the first image frame of the further pair of successive image frames and a second mask in the second image frame of the further pair of successive image frames. The deciding function is configured to, on condition that the further IoU differs from the calculated IoUs of the plurality of pairs of successive image frames by more than a threshold amount, decide to refrain from using re-identification in tracking the object in the further pair of successive image frames.

The above-mentioned optional additional features of the method according to the first aspect, when applicable, apply to the device according to the fourth aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

DETAILED DESCRIPTION

Figure 1:
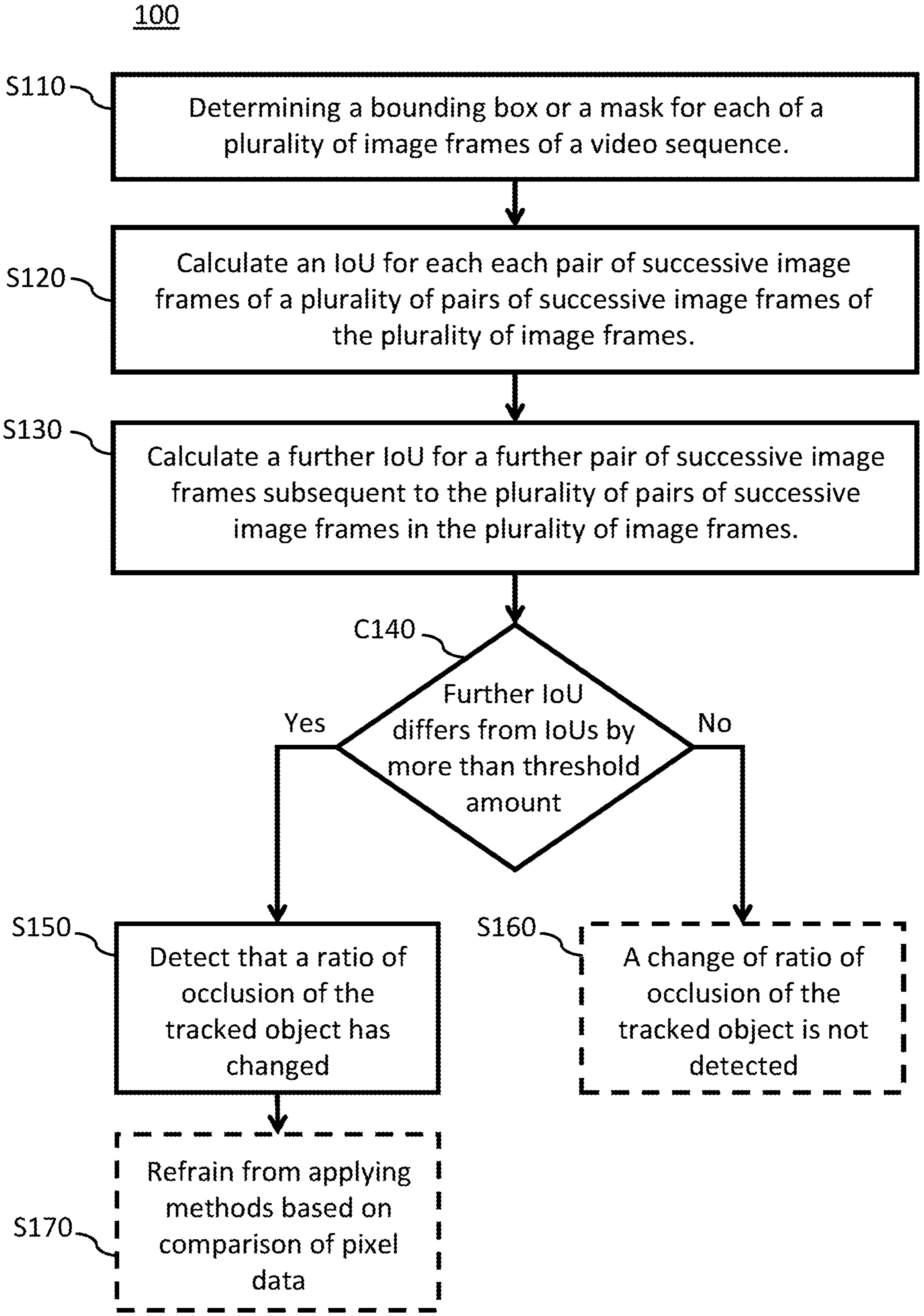
FIG. 1 shows a flow chart in relation to embodiments of a method of detecting a change of ratio of occlusion of a tracked object in a video sequence.

The present invention will now be described hereinafter with reference to the accompanying drawings, in which currently preferred embodiments of the invention are illustrated. This invention may, however, be embodied in many different forms and should not be construed as limited to the embodiments set forth herein.

The invention is applicable to scenarios where an object is tracked in a video sequence. In such scenarios it may be beneficial to detect when a ratio of occlusion of the tracked object changes. For example, in some embodiments, so-called frame-by-frame re-identification, or re-identification for short, may be used to assist in the tracking of the object, e.g., originally only based on a Kalman state, by also taking into account how likely it is based on re-identification that a candidate object in an image frame is the same object as an object detected in a previous frame by the object tracker. An example of such re-identification is DeepSORT described in https://arxiv.org/pdf/1703.07402.pdf In such embodiments, weighting can be used wherein indicating to what extent a detection should be based on re-identification and a Kalman state, respectively. In case a ratio of occlusion of the tracked object changes for a tracked object between a pair of successive image frames of a video sequence, e.g., because a part of the object visible in one of the image frames of the pair becomes occluded in the next image frame of the pair or vice versa, re-identification may not be useful to assist the tracking. Hence, in such a case it may be best to refrain from using re-identification, or at least reduce the weight of results from re-identification, when assisting the tracking in relation to the pair of successive image frames in which the change of the ratio of occlusion of the tracked object is detected. Other methods that make use of comparison of pixel data between an object and candidate objects are also affected by such a change of ratio of occlusion of a tracked object in a video sequence and thus, detecting change of ratio of occlusion of the tracked object may be a trigger to avoid using such methods or reducing the weight of the results of such methods in relation to a pair of successive image frames in which a change of the ratio of occlusion of the tracked object is detected.

According to embodiments of the invention, change of ratio of occlusion is detected by calculating IoUs between bounding boxes or masks of the tracked object in a plurality of pairs of successive image frames and detecting a difference over a threshold value of an IoU in a further pair of successive image frames in relation to the IoUs of the plurality of pairs of successive image frames. Additionally, such difference over a threshold value may also be due to other reasons than change of ratio of occlusion. Hence, when detecting a difference over a threshold value of an IoU in a further pair of successive image frames in relation to the IoUs of the plurality of pairs of successive image frames it may be generally beneficial to refrain from use of re-identification or other methods that make use of comparison of pixel data between an object and candidate objects, or at least reduce the weight thereof, when assisting tracking of an object.

Embodiments of a method 100 of detecting a change of ratio of occlusion of a tracked object in a video sequence will now be described in relation to the flow chart in FIG. 1 and the illustrations of bounding boxes and IoUs in FIGS. 2A-F.

In the method 100 a bounding box of the tracked object is determined S110 for each of a plurality of image frames of the video sequence. The bounding boxes may be determined using any known method for detecting objects and providing a bounding box that defines the extension of the detected object. Typically, a bounding box of a tracked object is the minimal or close to minimal box that encloses the tracked object. Known algorithms for detecting objects and providing bounding boxes are YOLO, MobileNet, and R-CNN. From R-CNN may also provide masks.

Figure 2A:
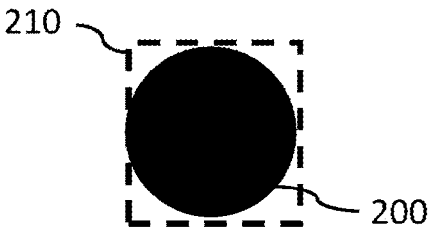
FIGS. 2A-F show illustrations of bounding boxes in pairs of successive image frames for a tracked object and IoUs between bounding boxes in the pairs of successive image frames.
Figure 2B:
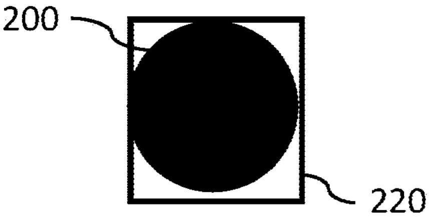
Figure 2C:
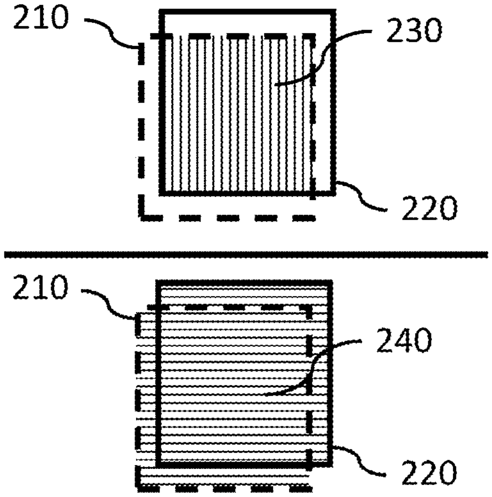
Figure 2D:
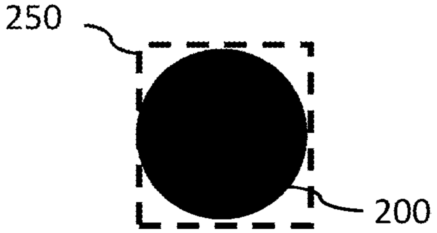
Figure 2E:
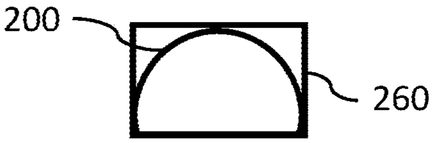

Turning now to FIGS. 2A, 2B, 2D, and 2E, a bounding box 210 with dashed lines around a tracked object 200 in a first image frame of a pair of successive image frames is illustrated in FIG. 2A, and a bounding box 220 with solid lines around the tracked object 200 in a second image frame of the pair of successive image frames is illustrated in FIG. 2B. Similarly, a bounding box 250 with dashed lines around a tracked object 200 in a first image frame of a further pair of successive image frames is illustrated in FIG. 2A, and a bounding box 260 with solid lines around the tracked object 200 in a second image frame of the further pair of successive image frames is illustrated in FIG. 2E. It is to be noted that in FIG. 2E, the object 200 has become partially occluded in the second image frame of the further pair of successive image frames and hence, the bounding box 260 has a different shape than the other bounding boxes 210, 220, 250 in FIGS. 2A, 2B, and 2D.

When selecting a bounding box in the second image of the pair of successive images from a number of candidate bounding boxes, the bounding box closest to the bounding box of the first image of the pair of successive images is typically selected. Similarly, when selecting a bounding box in the second image of the further pair of successive images from a number of candidate bounding boxes, the bounding box closest to the bounding box of the first image of the further pair of successive images is typically selected.

For each pair of successive image frames of a plurality of pairs of successive image frames of the plurality of image frames, an IoU of a first bounding box in a first image frame of the pair of successive image frames and a second bounding box in a second image frame of the pair of successive image frames is calculated S120. Typically, the plurality of pairs of successive image frames are overlapping such that each image frame is included in a pair with the preceding image frame and a pair with the subsequent image frame. This will be the result if for each image frame an IoU is calculated for a pair consisting of the image frame and the previous image in the video sequence. However, it is also possible for the plurality of pairs of successive image frames to be non-overlapping such that each image frame is included only in one pair but such that there is no image frame in a sequence that is not included in any pair. This will be the result if for every second image frame an IoU is calculated for a pair consisting of the image frame and the previous image in the video sequence. Preferably, either all pairs are overlapping, or all pairs are non-overlapping. However, a combination is feasible.

Turning now to FIGS. 2A-C, wherein FIG. 2C illustrates the IoU between the bounding box 210 of the tracked object 200 in the first image frame of the pair of successive image frames as illustrated in FIG. 2A and the bounding box 220 of the tracked object 200 in the second image frame of the pair of successive image frames as illustrated in FIG. 2B. The intersection 230 in the numerator is the area illustrated with vertical stripes and the union 240 in the denominator is illustrated in horizontal stripes. As can be seen from the difference in location between the bounding box 210 in the first image frame of the pair of successive image frames and the bounding box 220 in the second image of the pair of successive image frames, the object has moved between the first and second image frames of the pair of successive image frames. Furthermore, the size and shape of the bounding box 210 in the first image frame of the pair of successive image frames is the same as the size and shape of the bounding box 220 in the second image of the pair of successive image frames. On condition that the object 200 moves at the same or similar speed and that the ratio of occlusion is the same or within an acceptable range over the image frames of the plurality of pairs of image frames, the IoUs for the plurality of pairs will vary within a range including the example IoU illustrated in FIG. 2C.

For a further pair of successive image frames subsequent to the plurality of pairs of successive image frames in the plurality of image fames, a further intersection over union, IoU, of a first bounding box in a first image frame of the further pair of successive image frames and a second bounding box in a second image frame of the further pair of successive image frames is calculated S130. The further pair of successive image frames typically consists of the last image frame of the last pair of successive image frames of the plurality of image frames and the subsequent image frame of the plurality of image frames. In alternative, the further pair of successive image frames consists of the first and second image frame subsequent to the last image frame of the last pair of successive image frames of the plurality of image frames. The further pair of successive image frames may also comprise a pair of successive image frames even later in the plurality of image frames. However, it is preferred that the further pair of successive image frames are close to the last image frame of the last pair of successive image frames of the plurality of image frames.

Figure 2F:
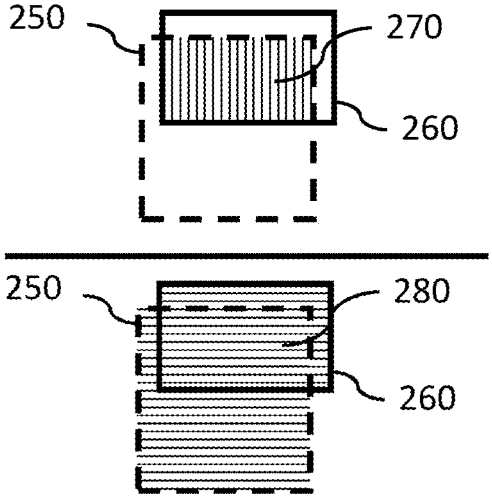

Turning now to FIGS. 2D-F, wherein FIG. 2F illustrates the further IoU between the bounding box 250 of the tracked object 200 in the first image frame of the further pair of successive image frames as illustrated in FIG. 2D and the bounding box 260 of the tracked object 200 in the second image frame of the further pair of successive image frames as illustrated in FIG. 2E. The intersection 270 in the numerator is the area illustrated with vertical stripes and the union 280 in the denominator is illustrated in vertical stripes. As can be seen from the difference in location between the bounding box 250 in the first image frame of the further pair of successive image frames and the bounding box 260 in the second image of the further pair of successive image frames, the object has moved between the first and second image frames of the pair of successive image frames. Furthermore, the size and shape of the bounding box 250 in the first image frame of the further pair of successive image frames is substantially different from the size and shape of the bounding box 260 in the second image of the further pair of successive image frames. This is due to that the object 200 has become partially occluded in the second image frame of the further pair of successive image frames.

On condition C140 that the further IoU differs from the calculated IoUs of the plurality of pairs of successive image frames by more than a threshold amount, it is detected S150 that a ratio of occlusion of the tracked object has changed. It is to be noted that it is the absolute value of the difference that is relevant as a change to a higher ratio of occlusion will have a difference in opposite value from a change to a lower ratio of occlusion.

Turning to FIGS. 2C and 2F, it can be seen that the size of the intersection 270 between the bounding box 250 of the tracked object 200 in the first image frame of the further pair of successive image frames and the bounding box 260 of the tracked object 200 in the second image frame of the further pair of successive image frames differs substantially from the intersection 230 between the bounding box 210 of the tracked object 200 in the first image frame of the pair of successive image frames and the bounding box 220 of the tracked object 200 in the second image frame of the pair of successive image frames. On the other hand, the difference is less between the size of the union 280 between the bounding box 250 of the tracked object 200 in the first image frame of the further pair of successive image frames and the bounding box 260 of the tracked object 200 in the second image frame of the further pair of successive image frames and the union 240 between the bounding box 210 of the tracked object 200 in the first image frame of the pair of successive image frames and the bounding box 220 of the tracked object 200 in the second image frame of the pair of successive image frames. Hence, the further IoU between the bounding box 250 of the tracked object 200 in the first image frame of the further pair of successive image frames and the bounding box 260 of the tracked object 200 in the second image frame of the further pair of successive image frames differs substantially from the IoU between the bounding box 210 of the tracked object 200 in the first image frame of the pair of successive image frames and the bounding box 220 of the tracked object 200 in the second image frame of the pair of successive image frames. Provided that the IoUs of the plurality of pairs of frames are generally similar to the IoU illustrated in FIG. 2C, the further IoU would differ from the calculated IoUs of the plurality of pairs of successive image frames by more than a threshold amount, and it would be detected S150 that a ratio of occlusion of the tracked object has changed.

The method 100 may further comprise calculating a mean or median of the IoUs of the plurality of pairs of successive image frames. The act of detecting S150 then comprises detecting that a ratio of occlusion of the tracked object has changed on condition that the further IoU differs from the determined mean or median of the IoUs of the plurality of pairs of successive image frames by more than the threshold amount.

The mean may either be an unweighted mean, or it may be a weighted mean. For example, a weighted mean may be used where a weight of an IoU increases with how late in the of pairs of successive image frames, i.e., the closer to the further pair of successive image frames, the pair of successive image frames occurs for which the IoU is calculated. For example, the weights may increase exponentially.

In addition to calculating a mean or median, the method 100 may further comprise calculating a variance of the IoUs of the plurality of pairs of successive image frames, and setting the threshold using the calculated variance. By setting the threshold using the calculated variance, the threshold may be set such that change of a ratio of occlusion of the tracked object is only detected if the further IoU differs from the calculated IoUs of the plurality of pairs of successive image frames more than normal variation within the plurality of pairs of successive image frames as indicated by the variance. Other measures indicating typical variation of the IoU of the pairs of successive image frames of the plurality of pairs of successive image frames are of course applicable when setting the threshold.

The method 100 has been described in relation to a particular instance in detection of a change in ratio of occlusion of a tracked object in a video sequence where it is to be determined whether a change in ratio of occlusion occurs in a further pair of successive image frames and where IoUs are first determined for a plurality of pairs of successive image frames occurring before the further pair of successive image frames in the video sequence. Typically, the detection is performed for each pair of successive image frames in a video sequence, such that for each pair of successive image frames in the video sequence a comparison of the IoU calculated for that pair of successive image frames is made to calculated IoUs for previous pairs of successive image frames in the video sequence in order to detect any change of rate of occlusion. The comparison may be made to the IoUs of a predetermined number of previous pairs of successive image frames, i.e., the plurality of pairs of successive image frames are predetermined number of pairs of successive image frames constituting a rolling window of previous pairs of successive image frames whose IoUs are used in the comparison.

The plurality of pairs of successive image frames should preferably be such that no detection of a change of ratio of occlusion has been detected for any pair of successive image frames of the plurality of pairs of successive image frames, i.e., such that the IoU of each pair of successive image frames of the plurality of image frames does not differ from IoUs of a plurality of pairs of successive image frames before that pair of successive image frames.

When a change of ratio of occlusion is detected for a (further) pair of successive image frames, the IoU will differ from the IoUs of the plurality of previous image frames and hence for a next pair of successive image frames after the further pair of successive image frames a change of ratio of occlusion should preferably be detected by comparison to the pair of successive image frames for which the change of ratio of occlusion is detected. Hence, when a change of ratio of occlusion is detected for a further pair of successive image frames, the plurality of pairs of successive image frames in the method should be selected starting from the pair of successive image frames for which the change of ratio of occlusion is detected. The plurality of pairs of successive image frames may thus be selected as all or a subset of the pairs of successive image frames since the previous pair of successive image frames for which a change of ratio of occlusion is detected or if no change of ratio of occlusion has been detected since the first pair of successive image frames for which the object is tracked.

Figure 3A:
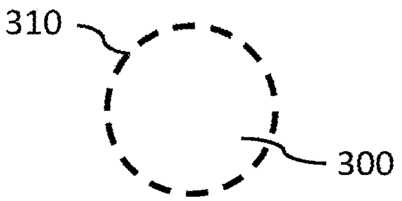
FIGS. 3A-F show illustrations of masks in pairs of successive image frames for a tracked object and IoUs between masks in the pairs of successive image frames.
Figure 3B:
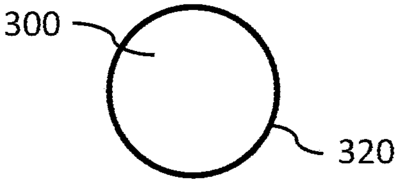
Figure 3C:
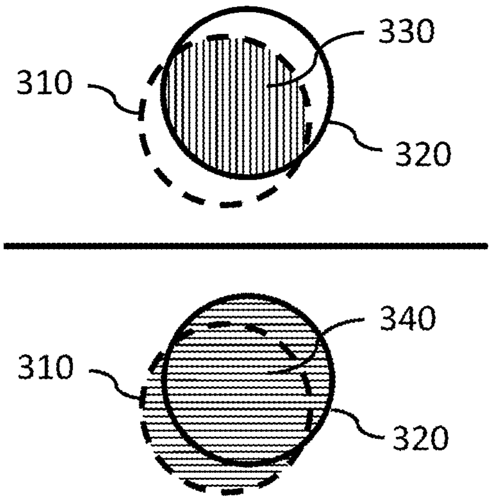
Figure 3D:
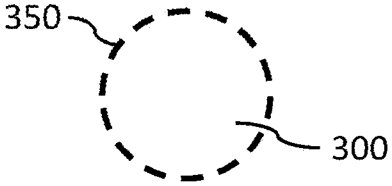
Figure 3E:
Figure 3F:
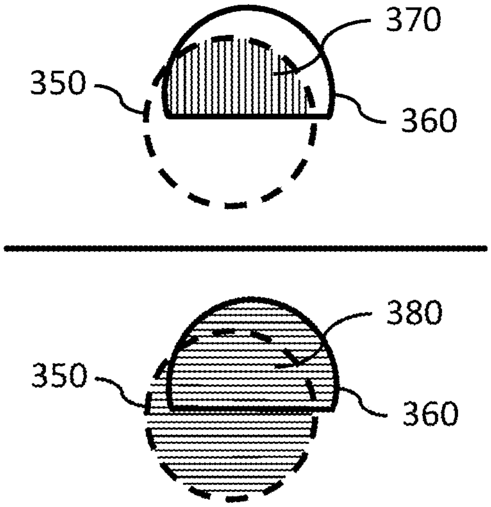

In alternative to determining bounding boxes and basing the IoUs calculated in the method 100 on the determined bounding boxes, masks can be determined and the IoUs may be calculated based on the determined masks. The masks may be determined using any known method for detecting objects and providing a mask that defines the extension of the detected object. Typically, a mask of a tracked object coincides with or is close to the outline of the tracked object. FIGS. 3A-F show illustrations of masks (310; 320; 350; 360) in pairs of successive image frames for a tracked object 300 and IoUs between masks (310; 320; 350; 360) in the pairs of successive image frames. FIG. 3C illustrates the IoU between the mask 310 of the tracked object 300 in the first image frame of the pair of successive image frames as illustrated in FIG. 3A and the mask 320 of the tracked object 300 in the second image frame of the pair of successive image frames as illustrated in FIG. 3B. The intersection 330 in the numerator is the area illustrated with vertical stripes and the union 240 in the denominator is illustrated in vertical stripes. As can be seen from the difference in location between the mask 310 in the first image frame of the pair of successive image frames and the mask 320 in the second image of the pair of successive image frames, the object has moved between the first and second image frames of the pair of successive image frames. Furthermore, the size and shape of the mask 310 in the first image frame of the pair of successive image frames is the same as the size and shape of the mask 320 in the second image of the pair of successive image frames. Specifically, the masks (310; 320) are circular and coincides with the outline of the tracked object 300. On condition that the object 300 moves at the same or similar speed and that the ratio of occlusion is the same or within an acceptable range over the image frames of the plurality of pairs of image frames, the IoUs for the plurality of pairs will vary within a range including the example IoU illustrated in FIG. 3C. Turning now to FIGS. 3D-F, wherein FIG. 3F illustrates the further IoU between the mask 350 of the tracked object 300 in the first image frame of the further pair of successive image frames as illustrated in FIG. 3D and the mask 360 of the tracked object 300 in the second image frame of the further pair of successive image frames as illustrated in FIG. 3E. The intersection 370 in the numerator is the area illustrated with vertical stripes and the union 380 in the denominator is illustrated in horizontal stripes. As can be seen from the difference in location between the mask 350 in the first image frame of the further pair of successive image frames and the mask 360 in the second image of the further pair of successive image frames, the object has moved between the first and second image frames of the pair of successive image frames. Furthermore, the size and shape of the mask 350 in the first image frame of the further pair of successive image frames is substantially different from the size and shape of the mask 360 in the second image of the further pair of successive image frames. This is due to that the object 300 has become partially occluded in the second image frame of the further pair of successive image frames. Comparing FIGS. 3C and 3F, it can be seen that the size of the intersection 370 between the mask 350 of the tracked object 300 in the first image frame of the further pair of successive image frames and the mask 360 of the tracked object 300 in the second image frame of the further pair of successive image frames differs substantially from the intersection 330 between the mask 310 of the tracked object 300 in the first image frame of the pair of successive image frames and the mask 320 of the tracked object 300 in the second image frame of the pair of successive image frames. On the other hand, the difference is less between the size of the union 380 between the mask 350 of the tracked object 300 in the first image frame of the further pair of successive image frames and the mask 360 of the tracked object 300 in the second image frame of the further pair of successive image frames and the union 340 between the mask 310 of the tracked object 300 in the first image frame of the pair of successive image frames and the mask 320 of the tracked object 300 in the second image frame of the pair of successive image frames. Hence, the further IoU between the mask 350 of the tracked object 300 in the first image frame of the further pair of successive image frames and the mask 360 of the tracked object 300 in the second image frame of the further pair of successive image frames differs substantially from the IoU between the mask 310 of the tracked object 300 in the first image frame of the pair of successive image frames and the mask 320 of the tracked object 300 in the second image frame of the pair of successive image frames.

Embodiments of a method 400 of deciding to refrain from using re-identification in tracking an object in image frames of a video sequence will now be described in relation to the flow chart in FIG. 4.

The method 400 comprises the act of determining S110, the act of calculating S120, the further act of calculating S130 in the same way as the method 100 as described in relation to FIG. 1. Hence, the detailed description of these acts in the method 100 in relation to FIG. 1 is applicable also for the method 400.

The method 400 differs from the method 100 in that the act of detecting S150 is replaced by an act of deciding S450. Specifically, on condition C140 that the further IoU differs from the calculated IoUs of the plurality of pairs of successive image frames by more than a threshold amount, it is decided S450 to refrain from using re-identification in tracking the object in the further pair of successive image frames. To this end, the condition C140 that the further IoU differs from the calculated IoUs of the plurality of pairs of successive image frames by more than a threshold amount, is identical to the condition C140 as described in relation to FIG. 1 and hence reference is made to the description of this in the method 100 in relation to FIG. 1. However, the method 400 does not necessarily need to include an explicit detection of a change of ratio of occlusion as in the method 100. Instead, the condition C140 in the method 400 is used to perform the act of deciding S450 if the condition C140 is fulfilled. Specifically, the act of deciding S450 comprises deciding S450 to refrain from using re-identification in tracking the object in the further pair of successive image frames.

Although a change of ratio of occlusion of the tracked object is the most common reason to a change of IoU in relation to previous IoUs by more than the threshold value, there are other reasons for such a change. Specifically, everything that causes a considerable change of the size, shape or location of a bounding box or mask of a tracked object between successive image frames will typically result in such a change of IoU in relation to previous IoUs by more than the threshold value. Such other reasons are for example, an abrupt change of pose of the tracked object, an abrupt change of shape of the tracked object, etc.

It is to be noted that even if there are other reasons than change of ratio of occlusion of the tracked object for a change of IoU in relation to previous IoUs by more than the threshold value, the other reasons constitute a small proportion of the total number of such changes of IoU in relation to previous IoUs by more than the threshold value. Hence, the small proportion of false detections of a change of ratio of occlusion of the tracked object in the method of 100 is generally acceptable.

In further embodiments, on condition that the further IoU differs from the IoUs of the plurality of pairs of successive image frames by more than a threshold amount, it may, alternatively or additionally to deciding to refrain from using re-identification, be decided to refrain from using, or reducing the weight of, one or more of other methods that make use of comparison of pixel data between an object and candidate objects, e.g., in relation to assisting tracking of the object.

Figure 4:
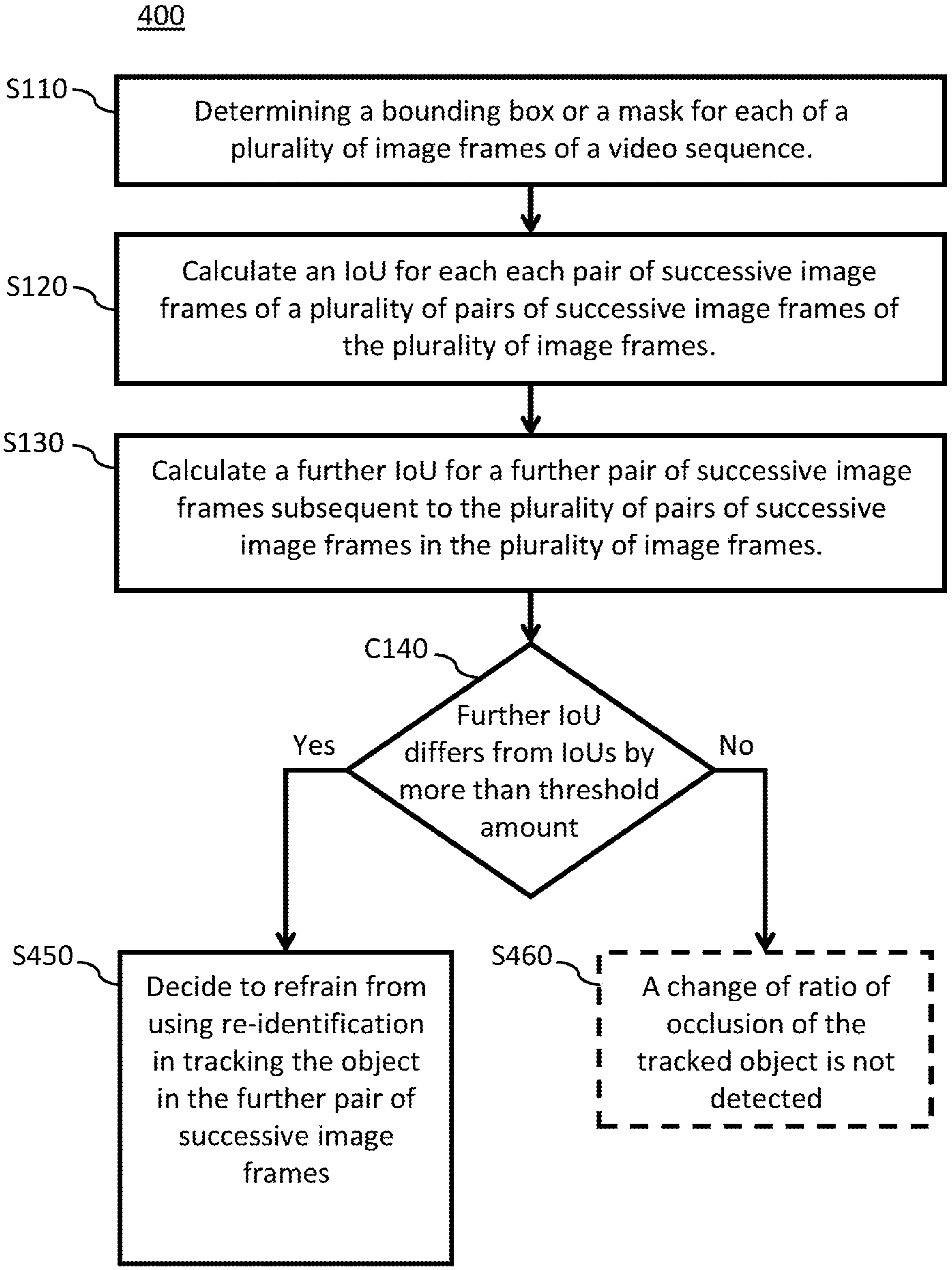
FIG. 4 shows a flow chart in relation to embodiments of a method of deciding to refrain from using re-identification in tracking an object in a video sequence.

The optional additional features of the method 100 described in relation to FIG. 1 and FIG. 2A-F, when applicable, apply also to the method 400 described in relation to FIG. 4.

Figure 5:
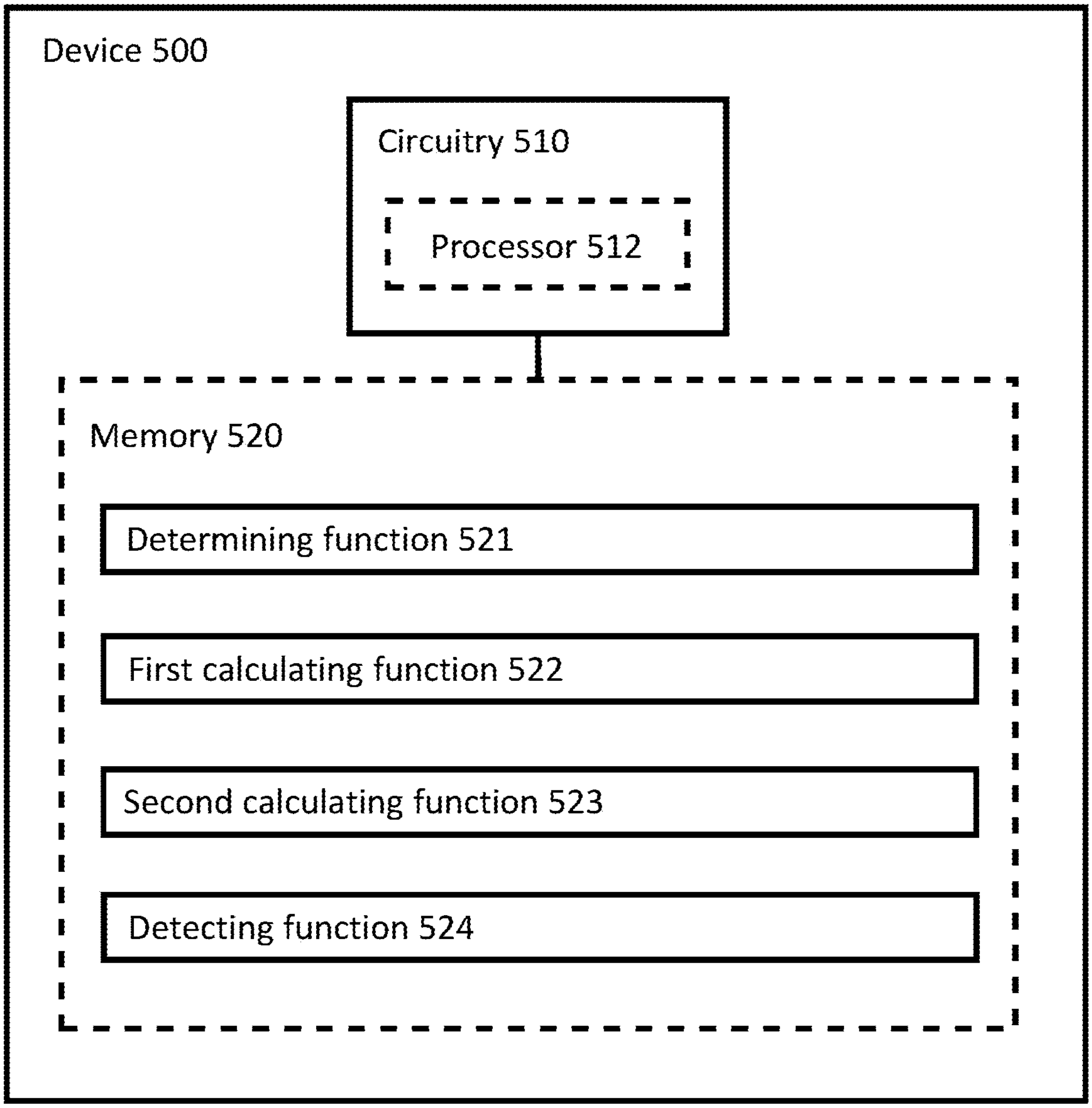
FIG. 5 shows a schematic diagram in relation to embodiments of a device.

FIG. 5 shows a block diagram in relation to embodiments of a device 500. The device 500 is configured to detect that a ratio of occlusion of the tracked object has changed. The device 500 may for example be a camera, be included in a camera or be connected to a camera.

The device 500 comprises a circuitry 510. The circuitry 510 is configured to carry out functions of the device 500. The circuitry 510 may include a processor 512, such as for example a central processing unit (CPU), graphical processing unit (GPU), tensor processing unit (TPU), microcontroller, or microprocessor. The processor 512 is configured to execute program code. The program code may for example be configured to carry out the functions of the device 500.

The device 500 may further comprise a memory 520. The memory 520 may be one or more of a buffer, a flash memory, a hard drive, a removable media, a volatile memory, a non-volatile memory, a random access memory (RAM), or another suitable device. In a typical arrangement, the memory 520 may include a non-volatile memory for long term data storage and a volatile memory that functions as device memory for the circuitry 510. The memory 520 may exchange data with the circuitry 510 over a data bus. Accompanying control lines and an address bus between the memory 520 and the circuitry 510 also may be present.

Functions of the device 500 may be embodied in the form of executable logic routines (e.g., lines of code, software programs, etc.) that are stored on a non-transitory computer readable medium (e.g., the memory 520) of the device 500 and are executed by the circuitry 510 (e.g., using the processor 512). Furthermore, the functions of the device 500 may be a stand-alone software application or form a part of a software application that carries out additional tasks related to the device 500. The described functions may be considered a method that a processing unit, e.g., the processor 512 of the circuitry 510 is configured to carry out. Also, while the described functions may be implemented in software, such functionality may as well be carried out via dedicated hardware or firmware, or some combination of hardware, firmware and/or software.

The circuitry 510 is configured to execute a determining function 521, a first calculating function 522, a second calculating function 523, and a detecting function 524.

The determining function 521 is configured to determine, for each of a plurality of image frames of a video sequence, a bounding box or a mask of the tracked object.

The first calculating function is configured to calculate, for each pair of successive image frames of a plurality 522 of pairs of successive image frames of the plurality of image frames, an intersection over union, IoU, of a first bounding box in a first image frame of the pair of successive image frames and a second bounding box in a second image frame of the pair of successive image frames or of a first mask in the first image frame of the pair of successive image frames and a second mask in the second image frame of the pair of successive image frames.

The second calculating function 523 is configured to calculate, for a further pair of successive image frames subsequent to the plurality of pairs of successive image frames in the plurality of image fames, a further intersection over union, IoU, of a first bounding box in a first image frame of the further pair of successive image frames and a second bounding box in a second image frame of the further pair of successive image frames or of a first mask in the first image frame of the further pair of successive image frames and a second mask in the second image frame of the further pair of successive image frames.

The detecting function 524 is configured to, on condition that the further IoU differs from the calculated IoUs of the plurality of pairs of successive image frames by more than a threshold amount, detect that a ratio of occlusion of the tracked object has changed.

The detailed description of the acts of the method 100 described in relation to FIG. 1 and FIGS. 2A-F hereinabove apply also for the corresponding functions of the device 500. Furthermore, the optional additional features of the method 100 described in relation to FIG. 1 and FIGS. 2A-F hereinabove, when applicable, apply also to the device 500.

Figure 6:
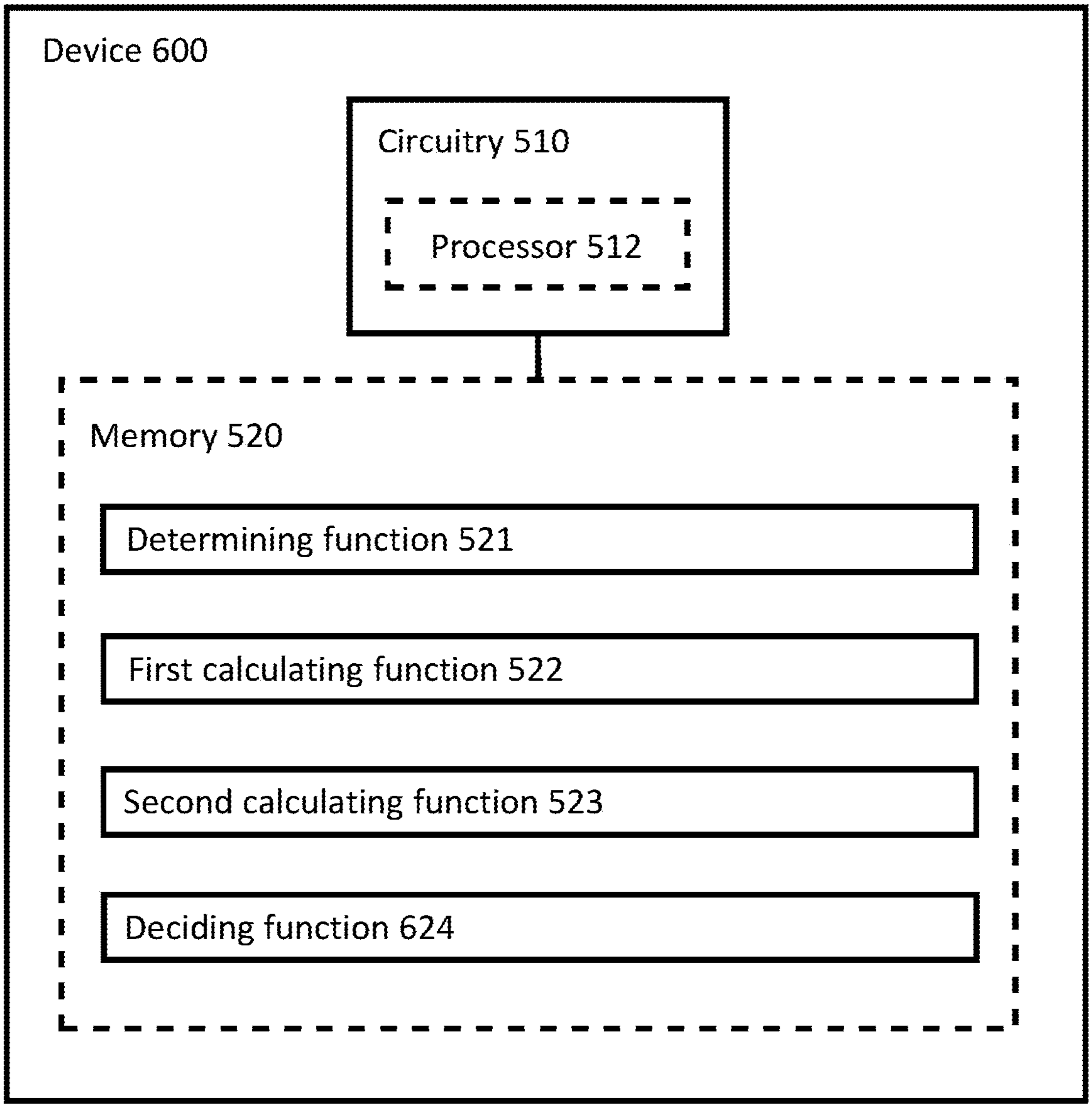
FIG. 6 shows a schematic diagram in relation to embodiments of a further device.

FIG. 6 shows a block diagram in relation to embodiments of a further device 600. The device 600 is configured to decide to refrain from using re-identification in tracking an object in a video sequence. The device 600 may for example be a camera, be included in a camera or be connected to a camera.

The device 600 is similar to the device 500 described in relation to FIG. 5. Hence, for a general description of the device 600 reference is made to the general description of the device 500 in relation to FIG. 5.

The device 600 comprises a circuitry 510 configured to execute the determining function 521, the first calculating function 522, and the second calculating function 523 as described in relation to FIG. 5. Furthermore, instead of the detecting function 524 described in relation to FIG. 5, the circuitry 510 of the device 600 is configured to execute a deciding function 624.

The deciding function 624 is configured to, on condition that the further IoU differs from the calculated IoUs of the plurality of pairs of successive image frames by more than a threshold amount, decide to refrain from using re-identification in tracking the object in the further pair of successive image frames.

The detailed description of the acts of the method 100 described in relation to FIG. 1 and FIGS. 2A-F and the detailed description of the acts of the method 300 described in relation to FIG. 2 hereinabove apply also for the corresponding functions of the device 600. Furthermore, the optional additional features of the method 100 described in relation to FIG. 1 and FIGS. 2A-F and the optional additional features of the method 300 described in relation to FIG. 3 hereinabove, when applicable, apply also to the further device 600.

Even even if it is disclosed herein that a IoU is calculated for each of a plurality of successive image frames and an IoU of a further pair of successive image frames is compared to the IoUs of the plurality of pairs of successive image frame, it is feasible to only determine an IoU of one pair of successive image frames and then compare the IoU of the further pair of successive image frames to the IoU of the one pair of successive image frames. However, the methods and devices will be less accurate using only one pair of successive image frames for comparison. Furthermore, even if it is disclosed herein that the pair of image frames are pairs of successive image frame, it is feasible also to use pairs of image frames that are not successive but which are distanced by one or more intermediate image frames in the plurality of image frames. However, the methods and devices will be less accurate the further away the image frames are in each pair of image frames.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A computer implemented method of detecting a change of ratio of occlusion of a tracked object in a video sequence, the method comprising:

determining, for each of a plurality of image frames of the video sequence, a bounding box or a mask of the tracked object;

calculating, for each pair of successive image frames of a plurality of pairs of successive image frames of the plurality of image frames, an intersection over union, IoU, comprising a ratio of an area of intersection and an area of union of a first bounding box of the tracked object in a first image frame of the pair of successive image frames and a second bounding box of the tracked object in a second image frame of the pair of successive image frames or of a first mask of the tracked object in the first image frame of the pair of successive image frames and a second mask of the tracked object in the second image frame of the pair of successive image frames;

calculating, for a further pair of successive image frames subsequent to the plurality of pairs of successive image frames in the plurality of image fames, a further intersection over union, IoU, comprising a ratio of an area of intersection and an area of union of a first bounding box of the tracked object in a first image frame of the further pair of successive image frames and a second bounding box of the tracked object in a second image frame of the further pair of successive image frames or of a first mask of the tracked object in the first image frame of the further pair of successive image frames and a second mask of the tracked object in the second image frame of the further pair of successive image frames; and on condition that the further IoU differs from the calculated IoUs of the plurality of pairs of successive image frames by more than a threshold amount, detecting that a ratio of occlusion of the tracked object has changed.

2. The method according to claim 1, further comprising:

calculating a mean or median of the IoUs of the plurality of pairs of successive image frames, wherein the detecting comprises:

on condition that the further IoU differs from the determined mean or median of the IoUs of the plurality of pairs of successive image frames by more than a threshold amount, detecting that a ratio of occlusion of the tracked object has changed.

3. The method according to claim 2, further comprising:

calculating a variance of the IoUs of the plurality of pairs of successive image frames; and setting the threshold using the calculated variance.

4. A computer implemented method of deciding to refrain from using re-identification in tracking an object in image frames of a video sequence, the method comprising:

determining, for each of a plurality of image frames of the video sequence, a bounding box or a mask of the tracked object;

calculating, for each pair of successive image frames of a plurality of pairs of successive image frames of the plurality of image frames, an intersection over union, IoU, comprising a ratio of an area of intersection and an area of union of a first bounding box of the tracked object in a first image frame of the pair of successive image frames and a second bounding box of the tracked object in a second image frame of the pair of successive image frames or of a first mask of the tracked object in the first image frame of the pair of successive image frames and a second mask of the tracked object in the second image frame of the pair of successive image frames;

calculating, for a further pair of successive image frames subsequent to the plurality of pairs of successive image frames in the plurality of image fames, a further intersection over union, IoU, comprising a ratio of an area of intersection and an area of union of a first bounding box of the tracked object in a first image frame of the further pair of successive image frames and a second bounding box of the tracked object in a second image frame of the further pair of successive image frames or of a first mask of the tracked object in the first image frame of the further pair of successive image frames and a second mask of the tracked object in the second image frame of the further pair of successive image frames; and on condition that the further IoU differs from the calculated IoUs of the plurality of pairs of successive image frames by more than a threshold amount, deciding to refrain from using re-identification in tracking the object in the further pair of successive image frames.

5. The method according to claim 4, further comprising:

calculating a mean or median of the IoUs of the plurality of pairs of successive image frames, wherein deciding comprises:

on condition that the further IOU differs from the determined mean or median of the IoUs of the plurality of pairs of successive image frames by more than a threshold amount, deciding to refrain from using re-identification in tracking the object in the further pair of successive image frames.

6. The method according to claim 5, further comprising:

calculating a variance of the IoUs of the plurality of pairs of successive image frames, and setting the threshold using the calculated variance.

7. A device for detecting a change of ratio of occlusion of a tracked object in a video sequence, comprising:

a memory for storing instructions; and one or more processors, coupled to the memory, wherein the one or more processors are configured, based on the instructions, to:

determine, for each of a plurality of image frames of a video sequence, a bounding box or a mask of the tracked object;

calculate, for each pair of successive image frames of a plurality of pairs of successive image frames of the plurality of image frames, an intersection over union, IoU, comprising a ratio of an area of intersection and an area of union of a first bounding box of the tracked object in a first image frame of the pair of successive image frames and a second bounding box of the tracked object in a second image frame of the pair of successive image frames or of a first mask of the tracked object in the first image frame of the pair of successive image frames and a second mask of the tracked object in the second image frame of the pair of successive image frames;

calculate, for a further pair of successive image frames subsequent to the plurality of pairs of successive image frames in the plurality of image fames, a further intersection over union, IoU, comprising a ratio of an area of intersection and an area of union of a first bounding box of the tracked object in a first image frame of the further pair of successive image frames and a second bounding box of the tracked object in a second image frame of the further pair of successive image frames or of a first mask of the tracked object in the first image frame of the further pair of successive image frames and a second mask of the tracked object in the second image frame of the further pair of successive image frames; and on condition that the further IoU differs from the calculated IoUs of the plurality of pairs of successive image frames by more than a threshold amount, detect that a ratio of occlusion of the tracked object has changed.

8. The device according to claim 7, wherein the one or more processors are further configured, based on the instructions, to:

calculate a mean or median of the IoUs of the plurality of pairs of successive image frames, on condition that the further IoU differs from the determined mean or median of the IoUs of the plurality of pairs of successive image frames by more than a threshold amount, detecting that a ratio of occlusion of the tracked object has changed.

9. The device according to claim 8, wherein the one or more processors are further configured, based on the instructions, to:

calculate a variance of the IoUs of the plurality of pairs of successive image frames; and set the threshold using the calculated variance.

10. The device according to claim 7, wherein the one or more processors are further configured, based on the instructions to:

on condition that the further IoU differs from the calculated IoUs of the plurality of pairs of successive image frames by more than a threshold amount, decide to refrain from using re-identification in tracking the object in the further pair of successive image frames.

11. The device according to claim 10, wherein the wherein the one or more processors are further configured, based on the instructions to:

calculate a mean or median of the IoUs of the plurality of pairs of successive image frames, and on condition that the further IoU differs from the determined mean or median of the IoUs of the plurality of pairs of successive image frames by more than a threshold amount, decide to refrain from using re-identification in tracking the object in the further pair of successive image frames.

12. The device according to claim 11, wherein one or more processors are further configured, based on the instructions to:

calculate a variance of the IoUs of the plurality of pairs of successive image frames; and set the threshold using the calculated variance.

* * * * *